Figure 1:
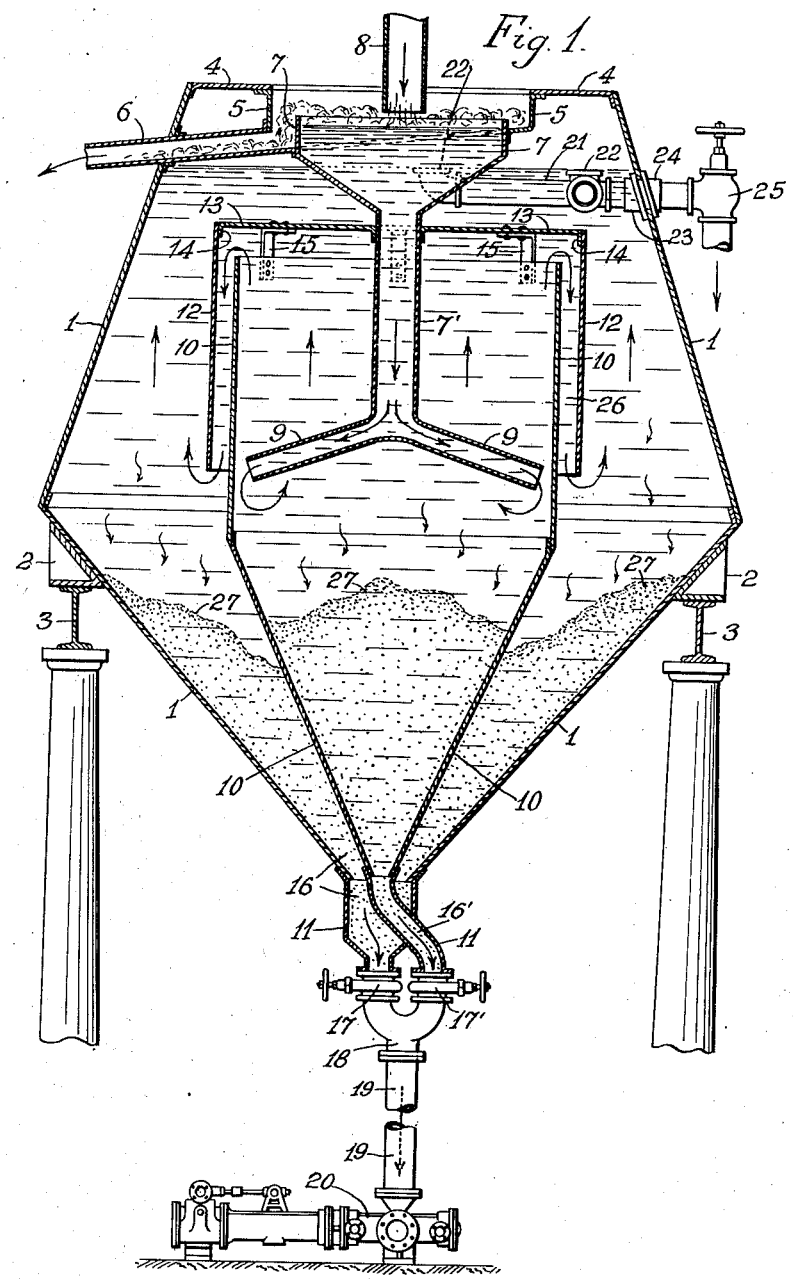

June 16, 1925.

F. J. CASABLANCA ET AL 1,542,666

CONTINUOUS CLARIFYING APPARATUS

Filed Nov. 27, 1923     2 Sheets-Sheet 1

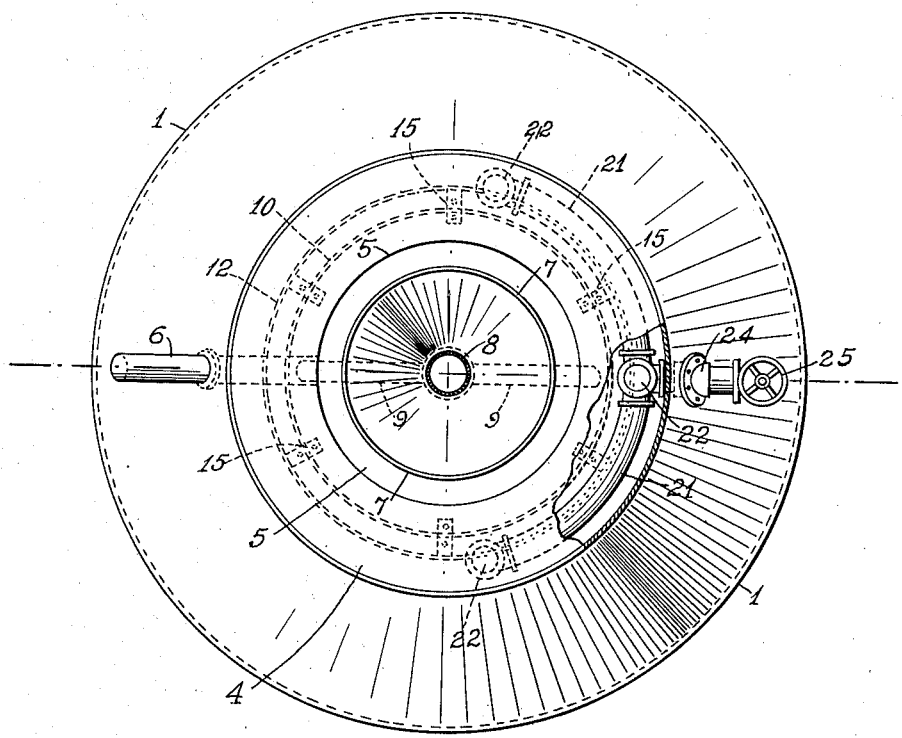

Patented June 16, 1925.

1,542,666

UNITED STATES PATENT OFFICE.

FRANK J. CASABLANCA AND MANUEL F. GALDO, OF CARDENAS, CUBA, ASSIGNORS TO THE CONTINUOUS CLARIFIER AND SETTLER CO., OF HABANA, CUBA, A CORPORATION OF CUBA.

CONTINUOUS CLARIFYING APPARATUS.

Application filed November 27, 1923. Serial No. 677,343.

*To all whom it may concern:*

Be it known that we, FRANK J. CASABLANCA, a citizen of the United States of America, and MANUEL F. GALDO, a citizen of the Republic of Cuba, both residents of Cardenas, Cuba, have invented certain new and useful Improvements in Continuous Clarifying Apparatus, of which the following is a complete specification.

This invention refers to the clarification or purification of liquids, and specially to the defecation of the sugar cane raw juices, to obtain the separation and elimination of the impurities held in suspension in them; its object being to provide an apparatus of continuous action to accomplish this purpose in such a way, that, due to its lower density, the clear liquid will flow out above and the settled impurities below; obtaining this continuous separation of the impurities by causing the liquid to change its direction and velocity of flow several successive times, preferably reducing the velocity on its upward motion (that is, against the action of gravity) and increasing the velocity on its downward motion (or with the action of gravity); and having this apparatus decided advantages over the now known clarifiers or defecators due to its simplicity of construction and action and economy effected by its use.

The invention is described with reference to the figures of the annexed drawings, of which:

Fig. 1 is a vertical diametral cross-section of a clarifying apparatus built according to this invention; and Fig. 2 is a plan top view of the same.

This apparatus consists of a tank or outside body 1, in the shape of two truncated inverted cones joined together; the lower cone (forming the bottom) being provided with brackets 2 for support on beams 3 of a suitable platform or staging. The upper cone of this tank 1, is covered with a flat plate 4, riveted to its upper border and having a large central opening, through which it is rigidly joined to a circular body 5, whose bottom slopes down towards one side, and having connected to its lowest point an inclined tube 6, which projects out through wall of tank 1, this body 5 thus forming a trough around a funnel shaped receptacle 7 whose upper edge is higher than the bottom of trough 5. Inside this funnel or receptacle 7 the tube marked 8 discharges the turbid liquid to be clarified, which liquid may be the sugar cane juices already limed and heated to near the boiling point. The funnel 7 is provided with a long downtake tube 7′ which reaches down and then branches into two opposite sloping discharge tubes 9.

Forming an intermediate body between outer tank 1 and downtake 7′ of funnel 7 is located a cylindrical tank with conical bottom 10, so that the ends of inclined tubes 9 are quite close to its shell. The conical bottom of this tank 10 is concentric with conical bottom of outer tank 1, both connecting with a two-passage piece 11, as it will be explained later.

Around the cylindrical body of tank 10, and at a short distance from it, is arranged a cylindrical bell 12, closed on its upper end by cover 13, which allows the passage of and is riveted to downtake tube 7′, through flange 14, and from which tank 10 is also supported or suspended by means of several angle plates 15.

The special piece 11 has two passages, the outside one 16 connecting to the mouth of conical bottom of outer tank 1, and the other passage 16′, connecting to the mouth of the conical bottom of inside tank 10; both passages 16 and 16′ being provided with valves 17 and 17′ and joining to a Y, 18, which connects through pipe 19 to a magma pump 20.

In the upper part and inside tank 1, there is an arrangement consisting of a bent tube 21, placed horizontal and more or less level with border of funnel 7, provided with several intakes 22, into which the clear juice overflows and is let out of the apparatus; tube 21 being connected through a short nipple 23, with another tube 24, outside of tank 1, and provided with controlling valve 25.

This apparatus or defecator works as follows: the turbid juice, previously limed and heated to almost 100° C. is discharged through the pipe 8 into the center of funnel 7. The foam formed by the liquid falling on the surface of the liquid in the funnel (when the defecator is working and therefore full of liquid) overflows over the top of the funnel 7 and falling in the trough 5, flows out through tube 6. The liquid or juice descends through tube 7', discharging through the inclined tubes 9 into the inner tank 10, until this is filled and then overflows over its upper edge and descending through the circular space 26, (formed by tank 10 and bell 12) falls into the outer tank 1 and filling this, the clear juice already clarified overflows into inlets 22 and out through valve 25.

The mud formed by the precipitated impurities on the conical bottom of tanks 1 and 10, falls out slowly through the spaces 16 and 16' of special piece 11, their discharge being controlled by the valves 17 and 17', and then falling through Y 18 and pipe 19 to magma pump 20, is sent to the mud tank or other place, according to the system used by the factory.

The defecator when working is always completely full of liquid. When this liquid falls into tanks 10 and 1, the heavier substances (forming the mud) fall to the bottom. This effect is assured and increased in two ways: first: by the changes of direction which the liquid is forced to take; that is, after falling into tank 10 through tubes 9, it flows upwards until the edge is reached, then moves downwards until reaching the lower edge of bell 12 it flows upwards again through tank 1; second: by the changes of velocity which the liquid suffers during its course through the apparatus, due to the difference in the area of the passes leading up and those leading down; the downward passes like tube 7' and space 26, having an area a great deal smaller than the upward passes, such as tanks 10 and 1.

Due to the very low velocity of the liquid in the relatively large sized tanks 1 and 10, plenty of time is given to the heavy particles to fall to the bottom, thus clarifying the liquid.

We wish to observe that the shape and construction of this apparatus may be changed within certain limits; as for instance, the number of bodies used to change the velocity and direction of the liquid may be changed, without in any way affecting the essential character or spirit of this invention, which is as set forth in the appended claim.

What we claim is:—

An apparatus for continuous clarification of liquids comprising a large diameter outer tank having a conical bottom and a flat cover plate; an inside cylindrical tank, open at the top, also having a conical bottom, and arranged concentric with the outer tank; a cylindrical bell, placed over and outside the cylindrical portion of the inside tank and leaving a short space between its top and the top edge of the tank, and also leaving a narrow circular space between the tank and the bell sides; a central down-take inlet tube passing through the cover plate of the outside tank and also through the bell and discharging into the inner tank, having a funnel-shaped upper part and smaller branched tubes in its lower end; a circular trough around the upper part of the funnel, to receive foam overflowing from said funnel and provided with a sloping bottom and with a discharge tube; a valve controlled nozzle with two passages, located at the extreme lower end of the conical bottoms, one communicating with the bottom of the inner tank and the other communicating with the bottom of the outer tank, to discharge the solid matter accumulated in the conical bottom of each tank; an outlet located horizontally inside the outer tank near the top and provided with a series of openings at the same level for outlet of the clear liquid, and a valve to control the same.

In witness whereof we affix our signatures.

MANUEL F. GALDO.
FRANK J. CASABLANCA.